US006857951B1

(12) United States Patent
Pauley

(10) Patent No.: US 6,857,951 B1
(45) Date of Patent: Feb. 22, 2005

(54) AQUAKNIFE

(76) Inventor: Alvin J. Pauley, 4570 Serna Ave., Valkaria, FL (US) 32950

( * ) Notice: Subject to any disclaimer, the term of this patent is extended or adjusted under 35 U.S.C. 154(b) by 0 days.

(21) Appl. No.: 10/449,293

(22) Filed: May 30, 2003

(51) Int. Cl.[7] ........................................ A22B 5/10
(52) U.S. Cl. ........................................ 452/102
(58) Field of Search ........................ 452/6, 102, 103, 452/104, 105

(56) References Cited

U.S. PATENT DOCUMENTS

| | | | | | |
|---|---|---|---|---|---|
| 2,557,272 | A | | 6/1951 | Gabriel | 17/5 |
| 3,667,086 | A | | 6/1972 | Sexton | 17/66 |
| D229,659 | S | | 12/1973 | Murnan | D7/106 |
| 4,205,441 | A | * | 6/1980 | Turner | 30/41.5 |
| 4,297,765 | A | | 11/1981 | Altman et al. | 17/66 |
| 4,574,431 | A | | 3/1986 | Colling | 17/66 |
| 4,615,079 | A | | 10/1986 | Chartrand | 17/66 |
| 4,633,585 | A | * | 1/1987 | Whitaker et al. | 30/41 |
| 4,868,982 | A | * | 9/1989 | McComas | 30/41 |
| 5,075,969 | A | * | 12/1991 | Jursich et al. | 30/41 |
| 5,365,666 | A | | 11/1994 | Gonzalez | 30/340 |
| 5,643,403 | A | * | 7/1997 | Poole et al. | 156/584 |

* cited by examiner

*Primary Examiner*—Thomas Price
(74) *Attorney, Agent, or Firm*—Brian S. Steinberger; Law Offices of Brian S. Steinberger, P.A.

(57) ABSTRACT

Self-cleaning knife device and method that allows an operator with one hand to both hold the knife by the handle and to control running water which is cleaning the blade. The knife can include a rotatable knob which can be rotated by the operator to lower and raise the valve which blocks the flow of water through a hollow space in the knife. The water supply for the knife can be a pressurized water supply such as a garden hose attached to the end of the handle opposite the end that is attached to the knife. The hollow space in the knife can include a tube that is pinched shut and opened by the moving valve member. The valve member can be a flat headed screw where the flat head is used to press into and pinch the tube running through the handle. The self-cleaning knife can also include a push button switch which must be constantly depressed.

15 Claims, 8 Drawing Sheets

AQUAKNIFE

This invention relates to a cleaning knife, in particular to a novel knife having water controlled valves for self cleaning by the knife operator

BACKGROUND AND PRIOR ART

Cleaning fish with a knife is a messy technique that is well known to fisherman and those preparing fish. Knives have been developed over the years for specifically filleting fish. See for example, U.S. Pat. No. Des. 229,659 to Murnan; U.S. Pat. No. 5,365,666 to Gonzalez; and U.S. Pat. No. 4,574,431 to Colling. In order to filet a fish, one must remove the scales, the head, the tail and also the insides with the knife. During the cleaning operation, the knife being used becomes quite dirty with debris and fluid such as blood. The operator usually needs to constantly clean the knife while it is being used. Keeping the knife clean becomes even more important when several fish or more are to be cleaned and/or filleted.

Common techniques to clean the knife have included passing the knife over a running a faucet within a sink, and running a spray end of a garden hose connected to a spigot over the knife. However, both techniques require extra delay time to maneuver the knife into a cleaning position. Additionally, both techniques cause an unnecessary mess to the sink or to surrounding areas where the running hose sprays.

Various types of cleaning type filet tools have been proposed over the years. See for example, U.S. Pat. No. 2,557,272 to Gabriel; U.S. Pat. No. 3,667,086 to Sexton; U.S. Pat. No. 4,297,765 to Altman et al.; and U.S. Pat. No. 4,615,079 to Chartrand. However, these devices generally rely on connecting a garden hose to the unit and constantly running water through the unit. To shut the water off, the operator must return to the spigot control. Thus, these units can further create undue messes as well as waste water that is running while the spigot is being turned on and off. Still furthermore, these units require connecting the running hose to a fish scaler or scraper. And there clearly are areas about the units that come in contact with fish that are not being thoroughly cleaned. Also, none of the units are useable with a knife.

Thus, there exists the need for better techniques for cleaning a fishing knife.

SUMMARY OF THE INVENTION

The first objective of the present invention is to provide a device and method for providing a knife that allows for thoroughly cleaning both sides of the knife blade.

The second objective of the present invention is to provide a device and method for providing a knife with a handgrip controlled cleaning valve for cleaning the knife.

The third objective of the present invention is to provide a device and method for cleaning a knife blade that controls a water hose through the knife itself.

The fourth objective of this invention is to provide a self-cleaning knife with finger(such as an operator's thumb) moveable valve that easily adjusts water spray for cleaning the knife blade.

The fifth objective of the invention is to provide a self-cleaning knife that additionally can clean table surfaces that the knife is being used on.

A preferred embodiment of the novel self-cleaning knife includes a handle having a first end and a second end and an axis therebetween, a single longitudinal knife blade attached to and extending outward from the first end of the handle, the knife blade having an axis extending from and identical to the handle axis, and a pressurized water supply such as that supplied by a garden hose, and the like, attached to the second end of the handle for running water in the handle to exit out on both side faces of the knife blade.

The self-cleaning knife can further include a finger activated control for turning on and off the water running through the handle on the handle. The control can include a rotatable valve, such as a knob having serrated edges on a top portion of the handle that rotates clockwise and counterclockwise. The knob can be attached to an internal valve member which vertically moves into and out of the running water inside the handle. The valve member can also pinch a flexible water carrying tube inside the handle to regulate the water supply.

Another embodiment of the invention can include a press-button switch that must be constantly depressed to allow water flow through the handle, which allows for direct selective use of the water spray without water waste or additional mess.

The invention can be used in a wide range of applications such as for a single fisherman, plant/industrial workers using multiple knives, and for various cleaning applications such as for cleaning blades used for fish, meats, and fowl, the latter such as but not limited to poultry applications.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
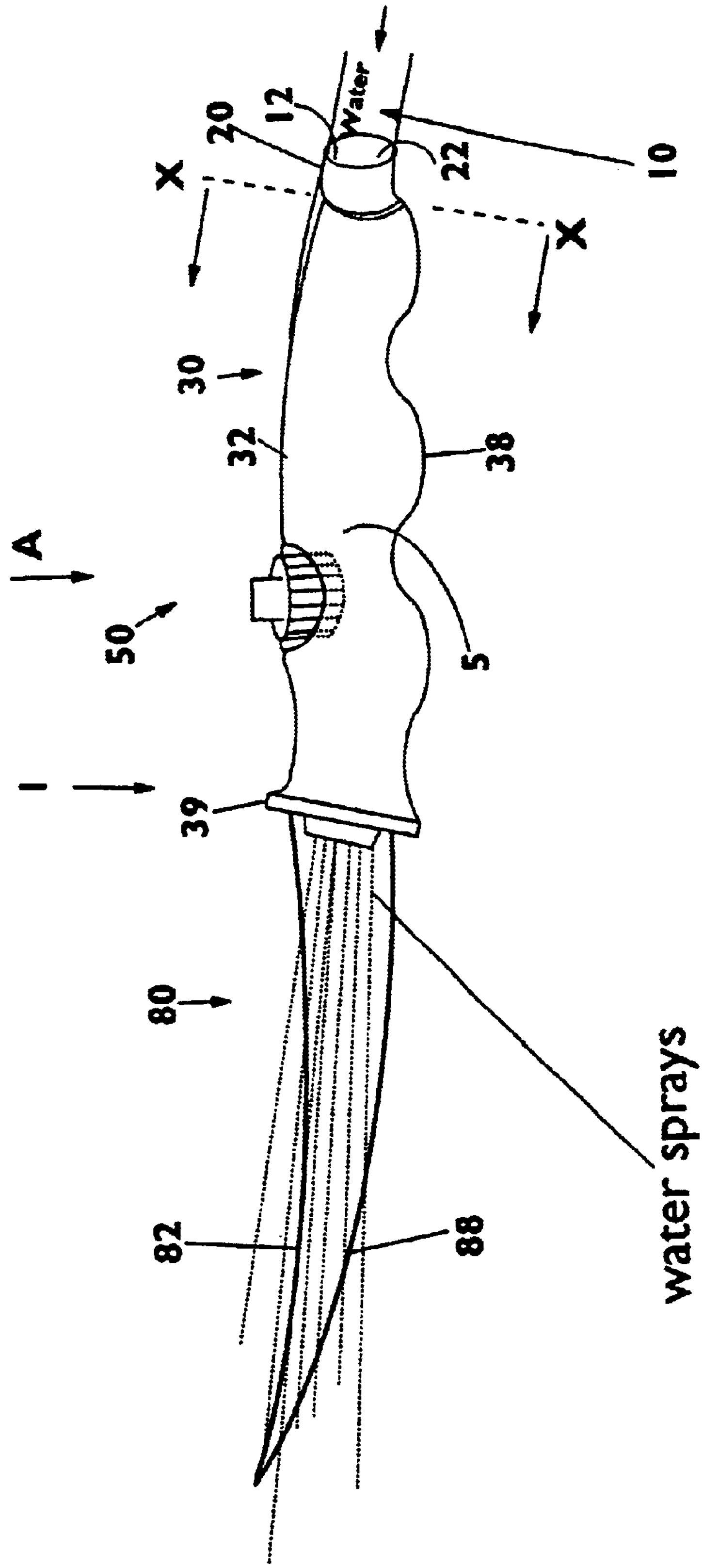
FIG. 1 is a perspective view of the novel self-cleaning knife invention.

FIG. 1 is a perspective view of the novel self-cleaning knife invention 1 with handle 30, control knob 50, that can be manipulated by an operator's finger, such as their thumb 5, and a knife blade 80. The knife can be connected to a pressurized water supply such as but not limited to a city water pressure source that connects through a plastic type garden hose 10 having a threaded end 12 which mateably is threaded into an interior threaded end opening 22 of an input 20 to a longitudinal handle 30.

The longitudinal handle 30 can be sized and shaped in an ergonomic configuration with a lower surface 38 having finger grip indentations, and an upper surface 32 having a control type knob 50 which would be toward a front portion of the handle adjacent to where the thumb type finger of an operator of the knife is located. A flat knife blade 80, preferably a single flat blade that can be connected to the front end of the handle 50, having at least one sharpened edge 88, such as a curved bottom edge and substantially straight upper edge 82. The blade 80 can have a length ranging from approximately 6 inches to approximately 9 inches long with or without a pointed tip and/or a curved pointed tip.

Figure 2:
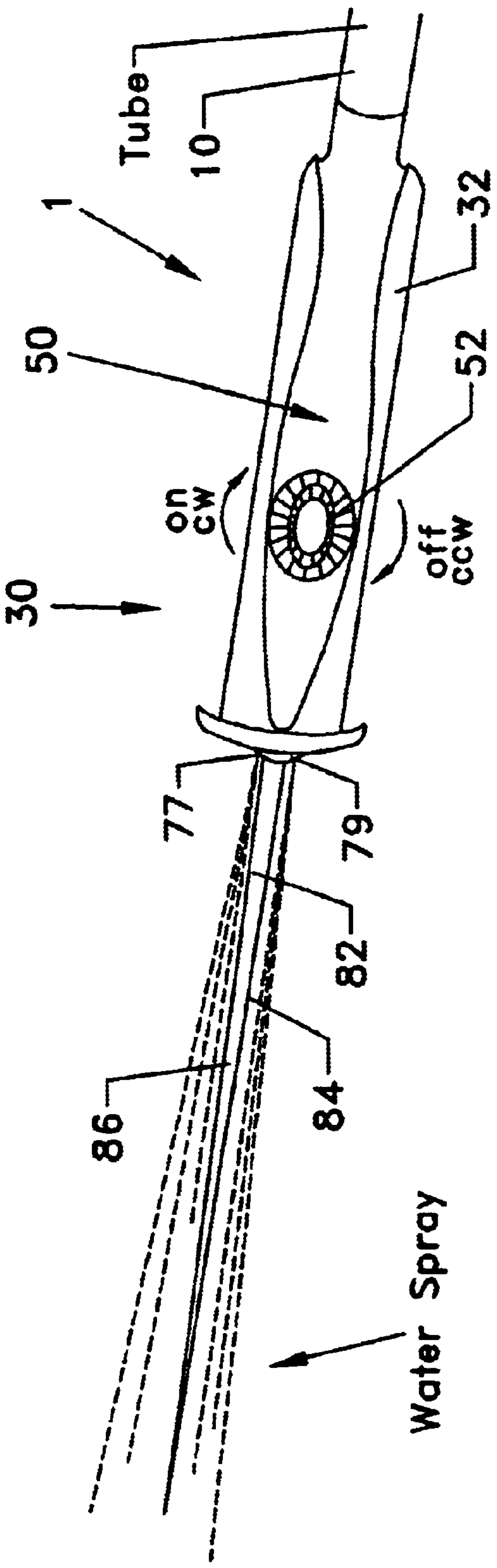
FIG. 2 is a top view of the self-cleaning knife of FIG. 1 along arrow A.

FIG. 2 is a top view of the self-cleaning knife 1 of FIG. 1 along arrow A. As shown in FIG. 2 the control knob 50 can have serrated and/or rough edges along an inwardly slanting top cap portion 52 that allows the operator greater dexterity to rotate the knob 50 by their thumb. As shown by arrow CW, rotating knob clockwise will allow water to run out of the nozzle type exit ports 77, 79 to effectively and simultaneously spray both faces 84, 86 on the blade 80. Rotating the knob in the direction of arrow CCW, counter-clockwise can shut off the water supply through the knife 1.

Figure 3:
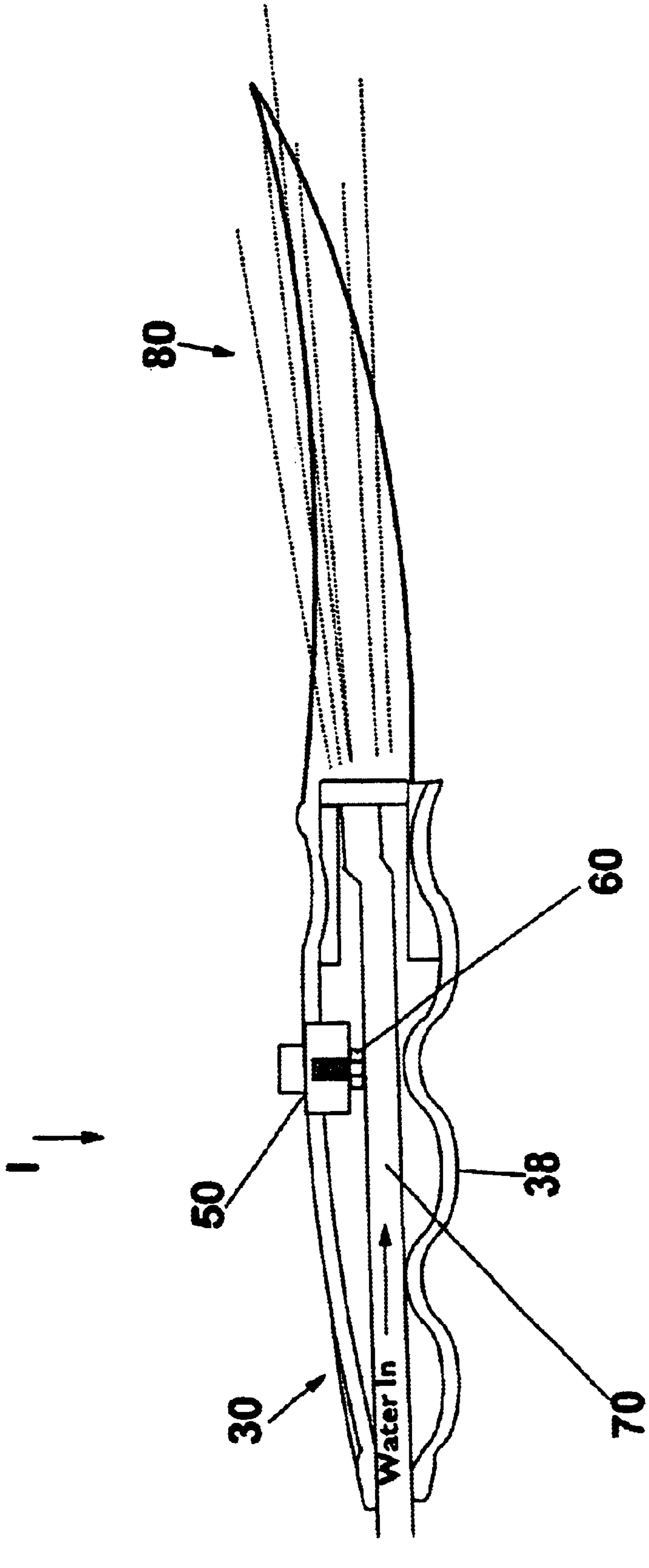
FIG. 3 is a cross-sectional view of the knife handle and blade of FIG. 1 along arrows X.
Figure 4A:
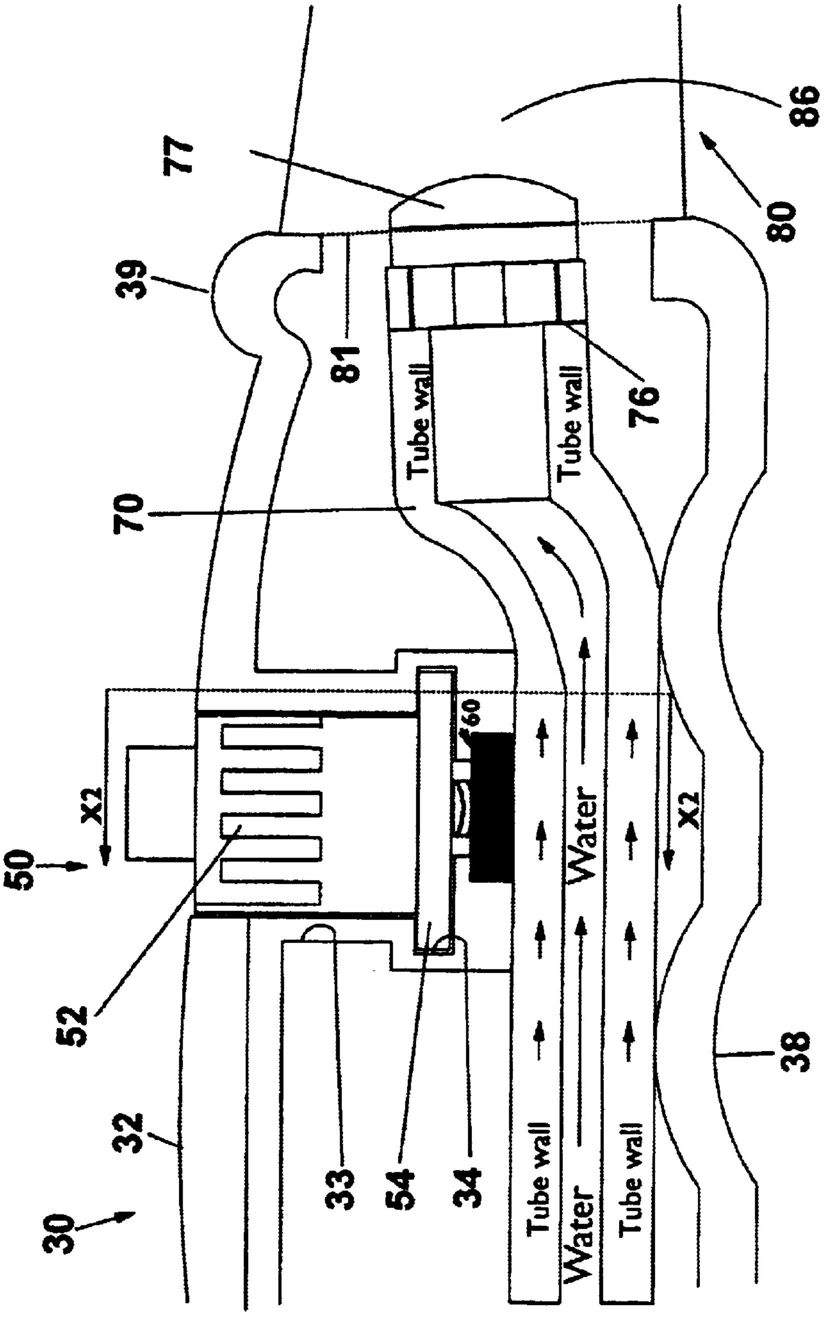
FIG. 4A is an enlarged view of the control knob and moveable valve screw inside the handle of FIG. 3 with the knob rotated to an open position.
Figure 4B:
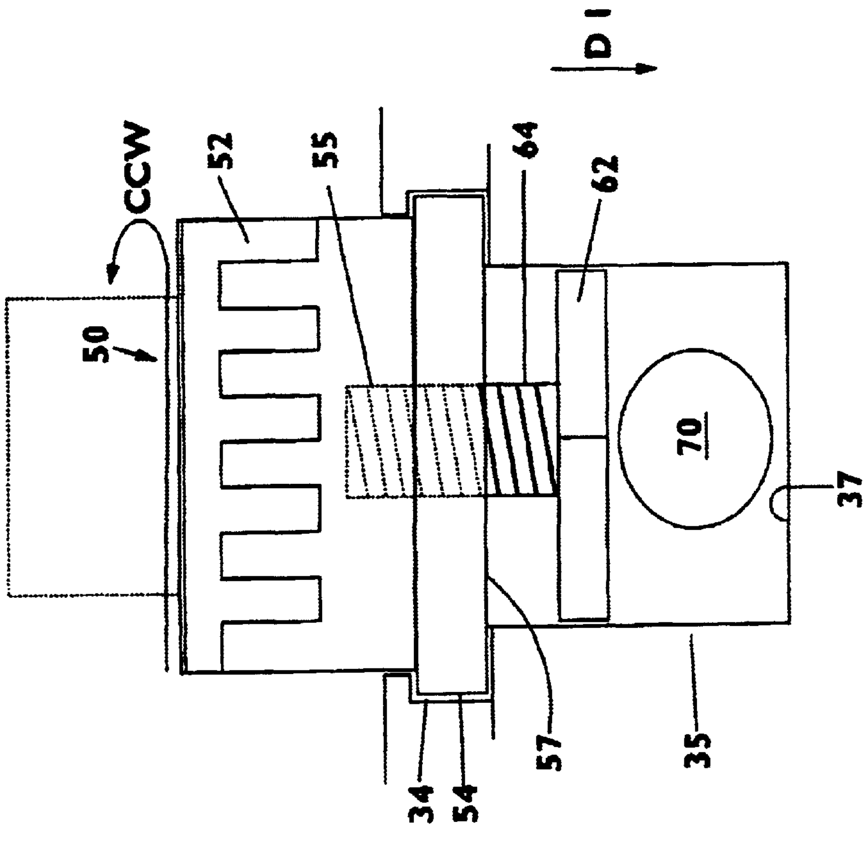
FIG. 4B is a cross-sectional view of the knob, valve screw and tube of FIG. 4A along arrows X2.
Figure 5A:
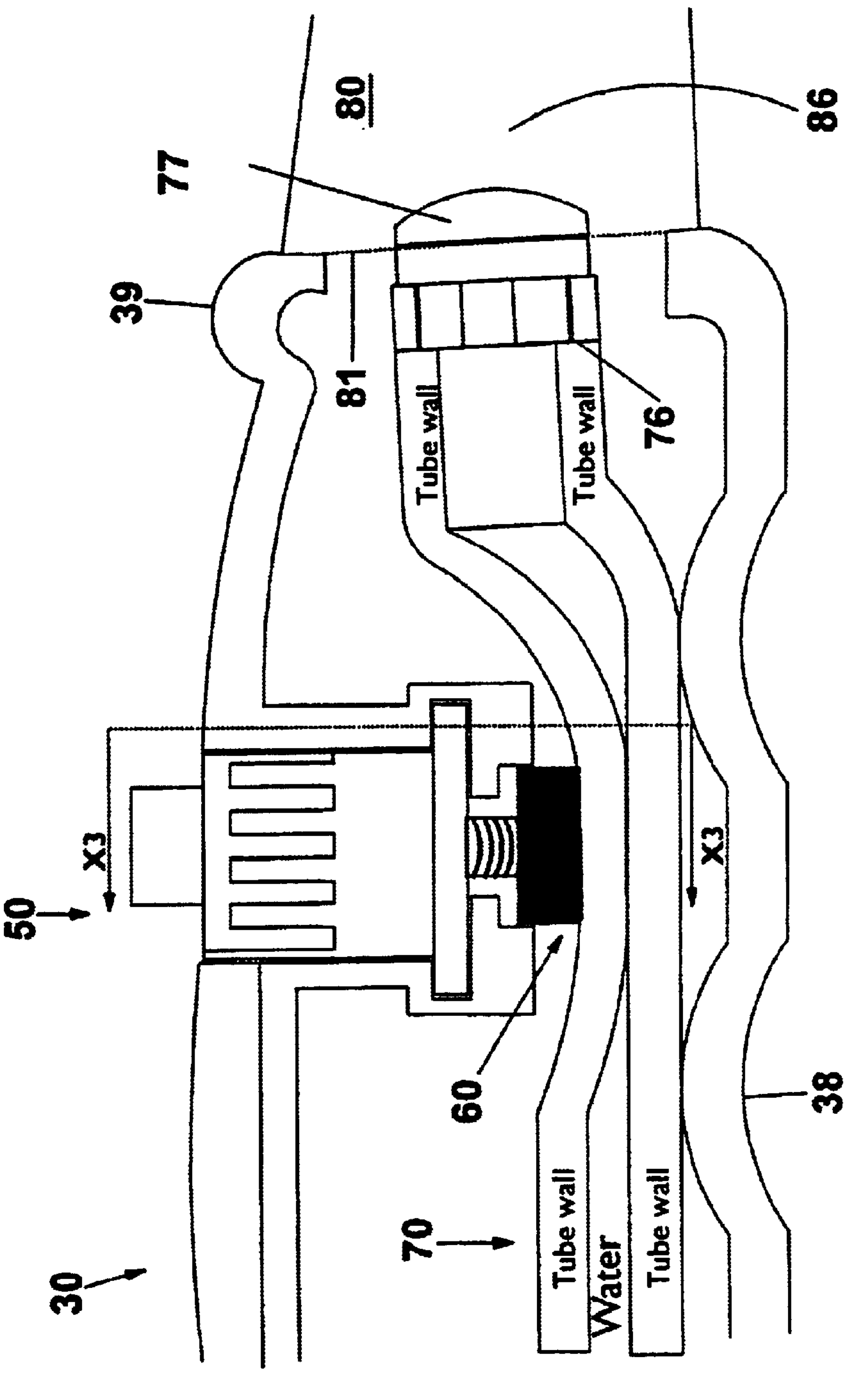
FIG. 5A is an enlarged view of the control knob and moveable valve screw inside the handle of FIG. 3 with the knob rotated to a closed position.
Figure 5B:
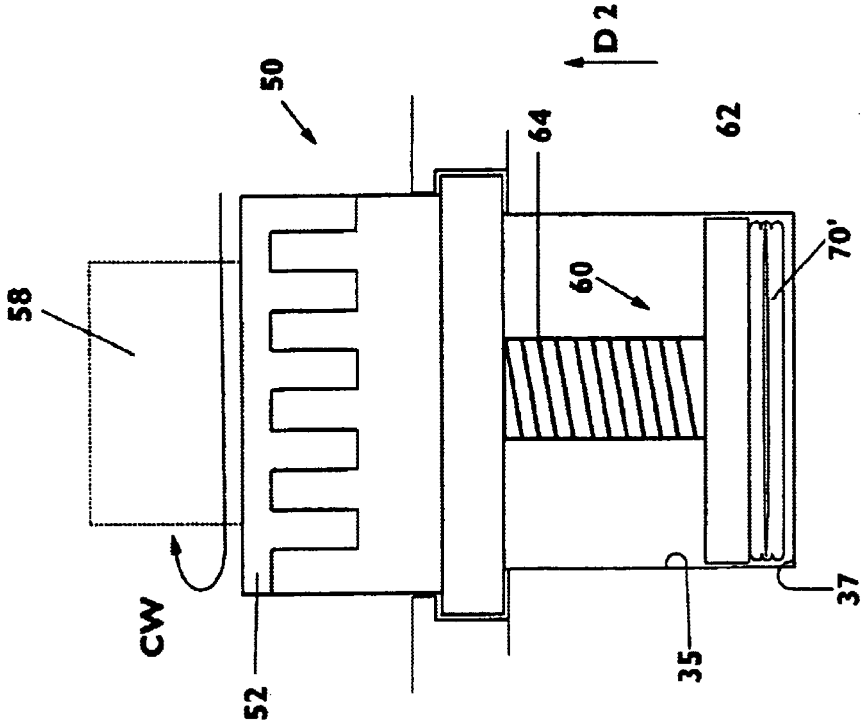
FIG. 5B is a cross-sectional view of the knob, valve screw and tube of FIG. 5A along arrows X3.

FIG. 3 is a cross-sectional view of the knife handle 30 and blade 80 of FIG. 1 along arrows X. FIG. 4A is an enlarged view of the control knob 50 and moveable valve screw 60 member, and flexible plastic type tube 70 inside the handle 30 of FIG. 3 with the knob 50 rotated to an open position. FIG. 4B is a cross-sectional view of the knob 50, valve screw 60 and tube 70 of FIG. 4A along arrows X2. FIG. 5A is an enlarged view of the control knob 50 and moveable valve screw 60 inside the handle 30 of FIG. 3, with the knob 50 rotated to a closed position. FIG. 5B is a cross-sectional view of the knob 50, valve screw 60 and tube 70 of FIG. 5A along arrows X3.

Referring to FIGS. 3, 4A, 4B, 5A and 5B, the control knob 50 can have an enlarged base 54 inside handle 30 that allows the knob 50 to freely rotate in a horizontal direction and not move up and down within the support space 53. Extending downward beneath the knob 50 can be an upside down hexagonal screw 60 having a flat head 62 and elongated threaded shaft which is received within a mateable threaded interior opening 55 in the bottom of the knob 50. The screw 60 can also be a square head screw and the like. The flat head 62 can be positioned to move within parallel chamber walls 35 within handle 30 so that while the knob 50 is rotated in the CCW(counter clockwise) direction, the screw 60 can move downward in the direction of arrow D1 to compress the tube 70 running through the handle 30 between chamber walls 35 and chamber floor 37. In essence the screw can function as a control valve to control the amount of water passing through the tube 70. When the tube 70 is fully compressed by screw 60 into position 70' no water can run through the handle to exit out ports 77, 79 to spray the blade 80.

Rotating the knob 50 in the CW(clockwise) direction raises the screw 60 upward in the direction of arrow D2 uncompressing tube 70' allowing water to pass back through the handle 30 to spray onto both side faces of blade 80. The operator can easily control the amount of water passing through the handle 30 by selectively rotating the knob 50 to different positions. Thus, the spray intensity can be regulated by the amount of turning of the knob 50. The knob 50 is limited in the clockwise and counter clockwise rotation directions by the flat head portion 62 abutting against the chamber floor 37 and against the bottom surface 57 of knob base 54. Knob 50 can also include a raised tab 58 with flat type sides extending above cap portion 52 which allows an operator to use two fingers such as thumb and forefinger to twist the knob 50 to give more leverage to turn on and off the water flow through the handle 30. Persons such as but not limited to elderly people, and/or those wearing gloves can use the twist knob tab as an alternative to spinning the knob 50 with their thumb.

Referring to FIGS. 1–5B, the base end 81 of the blade 80 can be attached to the shield end 39 of the handle 30 along the diameter region of the end 76 of the tube 70 splitting the end of the tube into two exit ports. Nozzle type members 77, 79 can be used to further adjust, and direct the water exiting the tube 70 into a spray.

Water passing through the handle can spray out across both side faces of the blade easily cleaning off any fluids such as but not limited to blood, and the like, and other types of debris that may become stuck on the blade surfaces. A raised shield portion 39 across the front end of handle 30 can help shield the operator from any materials and fluids that fly backward when the water spray is hitting the side faces of the blade 80.

The invention can also be used by the operator to clean table top surfaces which become dirty when the knife is being used. Thus, the self-cleaning knife 1 can clean both the knife blades and the table top surface that the knife is being used on.

Although a rotatable knob 50 is shown, the invention can use additional types of water pressure controls, such as but not limited to depressible valves that can be used also to pinch the interior tube 70 running through the handle 30.

Figure 6:
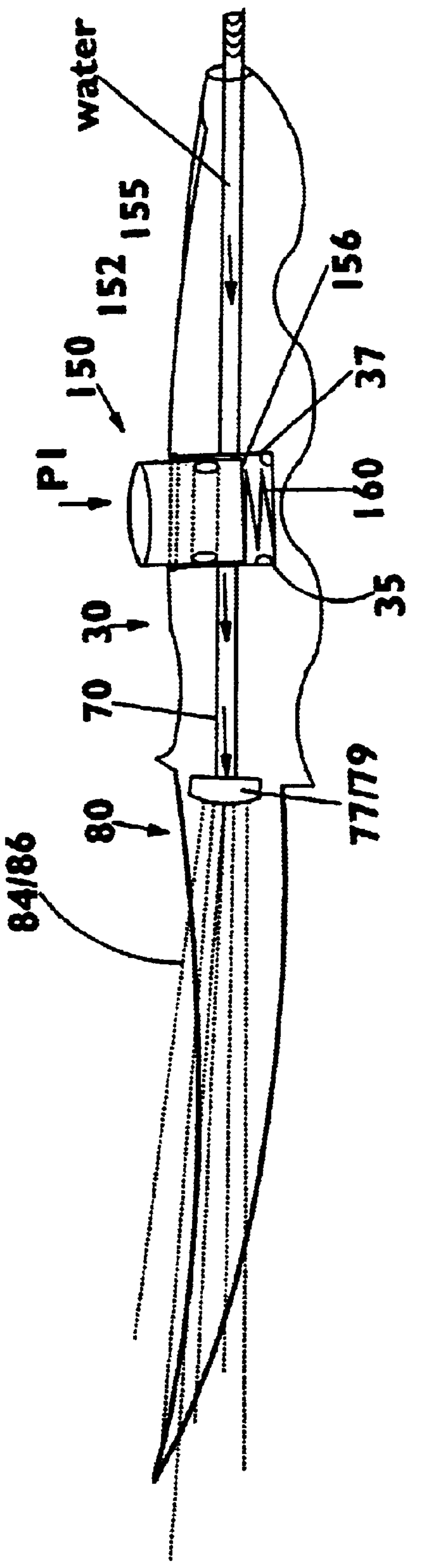
FIG. 6 is a cross-sectional view of an alternative push-button on/off switch embodiment for the handle of the self-cleaning knife.

FIG. 6 is a cross-sectional view of an alternative push-button on/off switch embodiment 100 for the handle 30 on the self-cleaning knife. The push-button switch can include a cylindrical main body 150 having cylindrical sides 156 with a through-hole 155 running from one side to the other. Pressing down on the top of button 150 with the thumb finger in the direction of arrow P1 causes the switch to press against an interior spring 160 inside the chamber walls 35 and floor 37. The through-hole 155 lines up with the water flow line 70 inside the handle 30 allowing water to flow and spray out nozzles 77, 79 onto blade side faces 84, 86. Preferably the operator can control water flow by constantly pressing down on the button, which saves water consumption unless the operator demands the spray function. Releasing the button causes spring 160 to expand and immediately shut off the water flow. The constant press down feature eliminates water waste when an operator forgets to turn off the rotatable knob 50 in the previous embodiment.

The novel press-button knob 150 can also be used side-by-side or in combination as part of the rotatable knob 50.

Although the control knobs are shown located on the top of the handle 30, the water flow controls can be located on the top and/or the sides and/or the bottom of the handle.

Although the fluid pressure supply to the self-cleaning knife has been described as including a waterhose from a city water supply, the pressure supply can be by a self-contained pressurized tank, such as a portable tank. The fluid for cleaning can also include cleaning solutions, such as but not limited to bleach, and the like, for antibacterial effects, and the like.

While the embodiment is described for use with an interior running flexible plastic tube, the invention can be used with other types of tubes such as rubber, and the like. Additionally, the invention can be used without a tube, wherein the moving valve member is sized to completely block the hollow tunnel space running through the handle.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended. PC

I claim:

1. A self-cleaning knife, comprising:

a handle having a first end and a second end and an axis therebetween;

a single longitudinal knife blade attached to and extending outward from the first end of the handle, the knife blade having an axis extending from and identical to the handle axis;

a control component for turning on and off the water;

a flexible tube adjacent to the handle;

a pressurized water supply attached to the second end of the handle for running water through the flexible tube and the handle which exits out along both sides of the knife blade, wherein the control component pinches the flexible tube to turn off the water.

2. The self-cleaning knife of claim 1, wherein the control component includes: a rotatable valve.

3. The self-cleaning knife of claim 2, wherein the rotatable valve includes:

a knob having serrated edges on a top portion of the handle that rotates clockwise and counterclockwise.

4. The self-cleaning knife of claim 2, further comprising:

an internal valve member which vertically moves into and out of the running water inside the handle.

5. The self-cleaning knife of claim 2, wherein the rotatable valve includes:

a knob having serrated edges which rotates in a horizontal direction.

6. The self-cleaning knife of claim 1, further comprising:

an internal valve member which vertically moves into and out of the running water inside the handle which is operated by the control component.

7. The self-cleaning knife of claim 6, further comprising:

a flexible tube inside the handle, wherein the control component pinches the tube to turn off the water.

8. The self-cleaning knife of claim 7, wherein the internal valve member includes: a screw, wherein the flat head pinches the tube to close off the water.

9. A self-cleaning knife, comprising in combination:

a handle having a conduit running through the handle, and having a first end opening and a second end opening;

a knife blade attached to handle adjacent to the first end opening; and means for running water through the second end opening of the handle through the conduit and out the first end opening to pass the water along both sides of the blade.

10. The self-cleaning knife of claim 9, further comprising:

a threaded end of a garden hose attached to the threaded surface on the second end opening of the handle.

11. A method of cleaning a knife comprising:

connecting one end of a hollow handle to a water supply;

running water through the hollow handle to pass out a second end of the handle along both sides of a single knife blade; and controlling the running water through the hollow handle by a mechanical switch on the handle.

12. The method of claim 11, wherein the step of controlling includes the step of:

rotating a knob on the handle to control output flow of the water along the blades.

13. The method of claim 12, wherein the pinching step includes:

pinching a water carrying tube inside with a flat headed screw which moves up and down by the rotating knob.

14. The method of claim 11, wherein the step of controlling includes the step of: moving a valve member into the path of the running water.

15. The method of claim 11, wherein the step of controlling includes the step of:

pinching a tube that allows the running water to pass through inside of the handle.

* * * * *